(12) United States Patent
Comerica et al.

(10) Patent No.: US 11,778,483 B2
(45) Date of Patent: *Oct. 3, 2023

(54) COMMUNICATION-PERFORMANCE CHARACTERIZATION VIA AUGMENTED REALITY

(71) Applicant: ARRIS Enterprises LLC, Suwanee, GA (US)

(72) Inventors: Subash Tirupachur Comerica, Sunnyvale, CA (US); Raghavendra Sadaramachandra, Sunnyvale, CA (US); Arsalan Habib, San Jose, CA (US); Anindya Chakraborty, Fremont, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,260

(22) Filed: Sep. 13, 2022

(65) Prior Publication Data
US 2023/0007502 A1    Jan. 5, 2023

Related U.S. Application Data

(63) Continuation of application No. 16/922,107, filed on Jul. 7, 2020, now Pat. No. 11,463,889.
(Continued)

(51) Int. Cl.
*G06T 11/60* (2006.01)
*H04B 17/23* (2015.01)
(Continued)

(52) U.S. Cl.
CPC ............ *H04W 16/18* (2013.01); *G06T 11/60* (2013.01); *H04B 17/23* (2015.01); *H04B 17/24* (2015.01);
(Continued)

(58) Field of Classification Search
CPC ......... G06T 11/001–80; H04B 17/0082–3913; H04L 41/12–26; H04L 41/5038;
(Continued)

(56) References Cited

U.S. PATENT DOCUMENTS 11,463,889 B2 * 10/2022 Comerica ............. H04W 16/18
2013/0267257 A1    10/2013 Palanki et al.
(Continued)

*Primary Examiner* — Timothy J Weidner
(74) *Attorney, Agent, or Firm* — Steven Stupp; Stewart Wiener

(57) ABSTRACT

An electronic device that assesses communication performance is described. During operation, the electronic device receives information specifying a location in an environment. For example, the information may correspond to user-interface activity associated with a user interface. Notably, the user interface may include an augmented reality and the user-interface activity may include defining the location, such as by dropping a pin in the augmented reality. Then, the electronic device provides the information to an access point and/or a controller of the access point, where the location is within communication range of the access point. Next, the electronic device receives, from the access point and/or the controller, measurements of one or more communication performance metrics at or proximate to the location during a time interval. Moreover, the electronic device provides a graphical representation of the communication performance at or proximate to the location based at least in part on the measurements.

20 Claims, 6 Drawing Sheets

Related U.S. Application Data

(60) Provisional application No. 62/871,704, filed on Jul. 8, 2019.

(51) Int. Cl.

| | |
|---|---|
| *H04B 17/24* | (2015.01) |
| *H04B 17/26* | (2015.01) |
| *H04B 17/27* | (2015.01) |
| *H04B 17/318* | (2015.01) |
| *H04B 17/336* | (2015.01) |
| *H04B 17/373* | (2015.01) |
| *H04B 17/391* | (2015.01) |
| *H04L 41/142* | (2022.01) |
| *H04L 41/14* | (2022.01) |
| *H04L 41/147* | (2022.01) |
| *H04L 41/22* | (2022.01) |
| *H04L 43/045* | (2022.01) |
| *H04L 43/0894* | (2022.01) |
| *H04L 43/12* | (2022.01) |
| *H04L 43/50* | (2022.01) |
| *H04W 16/18* | (2009.01) |
| *H04W 16/22* | (2009.01) |
| *H04W 24/08* | (2009.01) |
| *H04W 24/10* | (2009.01) |
| *H04W 64/00* | (2009.01) |
| *H04W 84/12* | (2009.01) |
| *H04W 88/08* | (2009.01) |
| *H04W 88/12* | (2009.01) |
| *H04W 92/12* | (2009.01) |

(52) U.S. Cl.
CPC ............. *H04B 17/26* (2015.01); *H04B 17/27* (2015.01); *H04B 17/318* (2015.01); *H04B 17/336* (2015.01); *H04B 17/373* (2015.01); *H04B 17/3912* (2015.01); *H04L 41/142* (2013.01); *H04L 41/145* (2013.01); *H04L 41/147* (2013.01); *H04L 41/22* (2013.01); *H04L 43/045* (2013.01); *H04L 43/0894* (2013.01); *H04L 43/12* (2013.01); *H04L 43/50* (2013.01); *H04W 16/22* (2013.01); *H04W 24/08* (2013.01); *H04W 24/10* (2013.01); *H04W 64/003* (2013.01); *H04W 84/12* (2013.01); *H04W 88/08* (2013.01); *H04W 88/12* (2013.01); *H04W 92/12* (2013.01)

(58) Field of Classification Search
CPC ......... H04L 41/5067; H04L 43/02–50; H04W 4/02–029; H04W 4/30–33; H04W 16/18–225; H04W 24/02–10; H04W 64/003–006; H04W 84/02; H04W 84/10–16; H04W 88/08–12; H04W 92/04; H04W 92/12
See application file for complete search history.

(56) References Cited

U.S. PATENT DOCUMENTS

| | | |
|---|---|---|
| 2015/0103685 A1 | 4/2015 | Butchko et al. |
| 2015/0381434 A1 | 12/2015 | Tamvada et al. |
| 2018/0332557 A1 | 11/2018 | Vuornos et al. |

* cited by examiner

COMMUNICATION-PERFORMANCE CHARACTERIZATION VIA AUGMENTED REALITY

CROSS REFERENCE TO RELATED APPLICATIONS

This application is a continuation of U.S. patent application Ser. No. 16/922,107, "Communication-Performance Characterization via Augmented Reality," filed on Jul. 7, 2020, by Subash Tirupachur Comerica, et al., which claims priority under 35 U.S.C. 119(e) to: U.S. Provisional Application Ser. No. 62/871,704, "Improved Communication-Performance Characterization Via Augmented Reality," filed on Jul. 8, 2019, by Subash Tirupachur Comerica, et al., the contents of both of which are herein incorporated by reference.

FIELD

The described embodiments relate to techniques for assessing communicating performance in an environment. Notably, the described embodiments relate to techniques for dynamically specifying and providing visual representations of communication performance in an environment.

BACKGROUND

Many electronic devices are capable of wirelessly communicating with other electronic devices. For example, these electronic devices can include a networking subsystem that implements a network interface for a wireless local area network (WLAN), e.g., a wireless network such as described in the Institute of Electrical and Electronics Engineers (IEEE) 802.11 standard. For example, a wireless network may include an access point that communicates wirelessly with one or more associated electronic devices (which are sometimes referred to as 'clients').

In order to ensure good communication performance, radio surveys are typically performed after deploying a wireless network in an environment, such as in a building. However, it can be challenging to identify low-signal areas or dead zones in an environment. For example, it is often difficult to determine positions in an indoor environment when a local positioning system is unavailable. The resulting position uncertainty may degrade the quality of a radio survey, and thus may make it more difficult to take appropriate corrective or remedial action.

SUMMARY

The described embodiments relate to an electronic device that characterizes communication performance. This electronic device may include: a network node; and an interface circuit that communicates with an access point or a controller of the access point. During operation, the electronic device may receive information specifying a location in an environment. For example, the information may specify the location relative to one or more visual landmarks in the environment. Then, the electronic device may provide the information to the access point and/or the controller, where the location is within communication range of the access point. Next, the electronic device may receive, from the access point and/or the controller, measurements of one or more communication performance metrics at or proximate to the location during a time interval. Moreover, the electronic device may provide a graphical representation of the communication performance at or proximate to the location based at least in part on the measurements.

Note that the electronic device may provide a user interface corresponding to the environment, and the information may correspond to user-interface activity associated with the user interface. For example, the user interface may include an augmented reality associated with the environment and the user-interface activity may include defining the location, such as by dropping a pin in the augmented reality.

Furthermore, providing the user interface may include displaying the user interface on a display and/or providing the graphical representation may include displaying the graphical representation.

Additionally, the electronic device may provide a visual indication to one or more other electronic devices. The visual indication may be intended for inclusion in instances of the user interface on the one or more other electronic devices and the visual indication may encourage communication with the one or more other electronic devices at or proximate to the location.

In some embodiments, the graphical representation includes a contour map.

Note that the electronic device may provide a layout of the environment along with the graphical representation. Alternatively or additionally, the electronic device may provide statistics summarizing the measurements with the graphical representation, and presentation of the statistics along with the graphical representation may be selectable via a user-interface icon associated with the location.

Moreover, the electronic device may include a portable electronic device (such as a cellular telephone).

Furthermore, the one or more communication performance metrics may include at least one of: a received signal strength indication (RSSI), a signal-to-noise ratio (SNR), or latency.

Additionally, the time interval may include: a day, a week or a month.

Another embodiment provides a computer-readable storage medium for use with the electronic device. When executed by the electronic device, this computer-readable storage medium causes the electronic device to perform at least some of the aforementioned operations.

Another embodiment provides a method, which may be performed by the electronic device. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
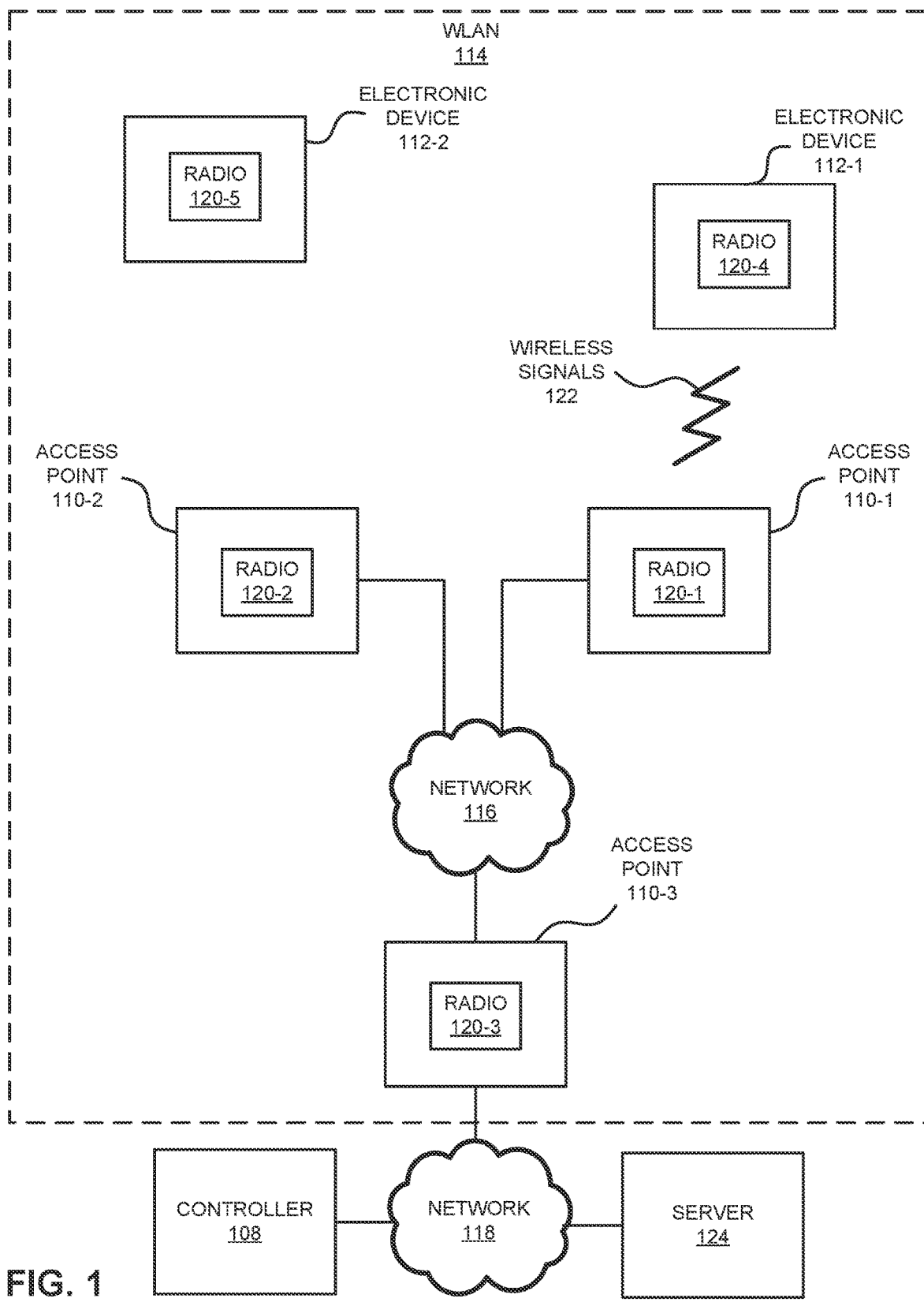
FIG. 1 is a block diagram illustrating communication among access points and electronic devices in a subnet in accordance with an embodiment of the present disclosure.

An electronic device that assesses communication performance is described. During operation, the electronic device receives information specifying a location in an environment. For example, the information may correspond to user-interface activity associated with a user interface. Notably, the user interface may include an augmented reality associated with the environment and the user-interface activity may include defining the location, such as by dropping a pin in the augmented reality. Then, the electronic device provides the information to an access point and/or a controller of the access point, where the location is within communication range of the access point. Next, the electronic device receives, from the access point and/or the controller, measurements of one or more communication performance metrics at or proximate to the location during a time interval. Moreover, the electronic device provides a graphical representation (such as a heat map) of the communication performance at or proximate to the location based at least in part on the measurements. In some embodiments, the electronic device provides a layout of the environment and/or statistics summarizing the measurements along with the graphical representation.

By providing a dynamic user interface that can be used to specify the location and display the graphical representation, the layout and/or the statistics, this communication may facilitate accurate characterization of the communication performance at or proximate to the location. Moreover, this characterization may be performed without the use of a local positioning system. For example, the information may specify the location relative to one or more visual landmarks in the environment (such as relative to walls of a building). Furthermore, the accurate characterization may facilitate appropriate corrective or remedial action for any problems that are identified. Consequently, the communication may facilitate improved communication performance in a wireless network (such as a wireless local area network or WLAN), and thus may improve the user experience when communicating via the WLAN.

In the discussion that follows, the electronic device and an access point communicate packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols (such as Long Term Evolution or LTE, another cellular-telephone communication protocol, etc.) may be used.

Moreover, the access point may communicate with other access points and/or computers in a network using a wired communication protocol, such as an IEEE 802.3 standard (which is sometimes referred to as 'Ethernet') and/or another type of wired interface. In the discussion that follows, Ethernet are used as an illustrative example.

FIG. 1 presents a block diagram illustrating an example of communication among one or more access points 110 and electronic devices 112 (such as a cellular telephone, and which are sometimes referred to as 'clients') in a WLAN 114 in accordance with some embodiments. Notably, access points 110 may communicate with each other in WLAN 114 using wireless and/or wired communication. Moreover, access points 110 may be configured and managed via one or more controllers, such as controller 108. Furthermore, at least one of access points 110 (such as access point 110-3) may provide access to a network 118 (such as the Internet, a cable network, a cellular-telephone network, etc.) that is external to WLAN 114. Additionally, at least some of access points 110 (such as access points 110-1 and 110-2) may communicate with electronic devices 112 using wireless communication. Note that access points 110 may include a physical access point and/or a virtual access point that is implemented in software in an environment of an electronic device or a computer.

The wired and/or wireless communication among access points 110 in WLAN 114 may occur via network 116 (such as an intra-net, a mesh network, point-to-point connections and/or the Internet) and may use a network communication protocol, such as Ethernet. This network may include one or more routers and/or switches (not shown). Furthermore, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, the wired and/or wireless communication among access points 110 also involves the use of dedicated connections, such as via a peer-to-peer (P2P) communication technique.

Figure 6:
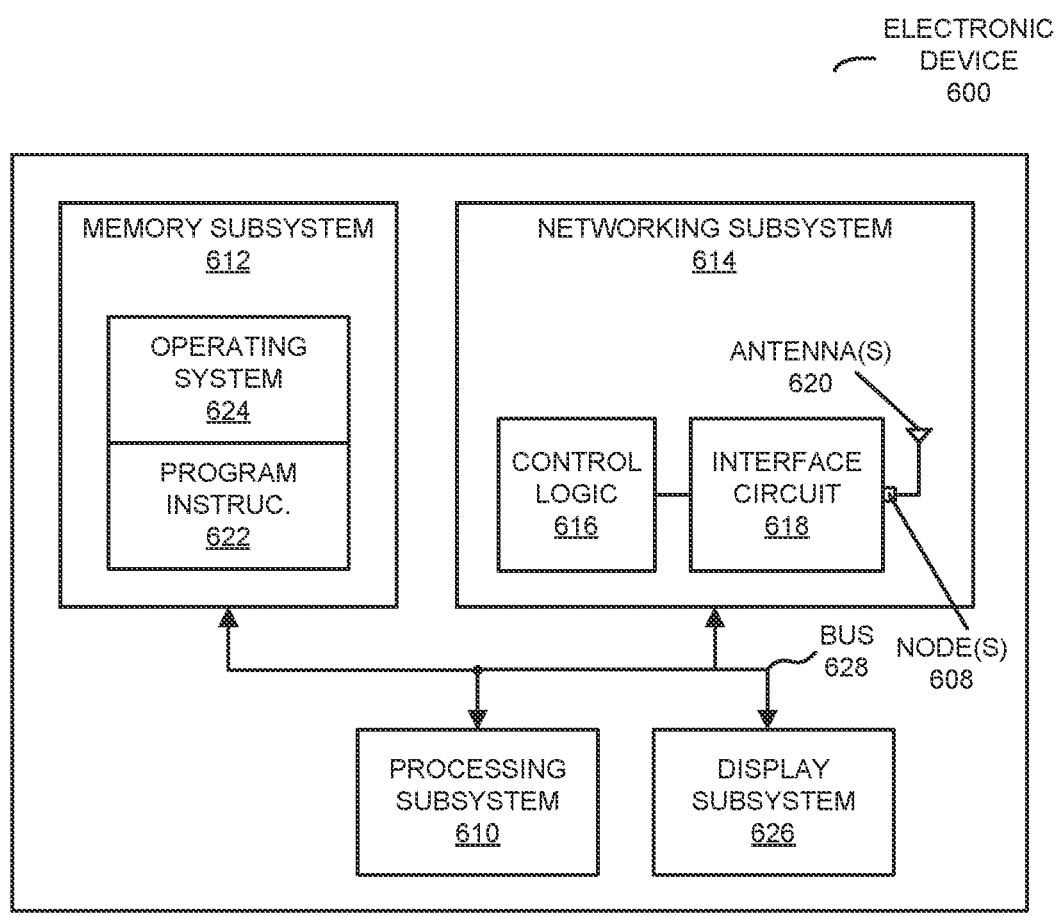
FIG. 6 is a block diagram illustrating an electronic device in accordance with an embodiment of the present disclosure.

As described further below with reference to FIG. 6, access points 110 and/or electronic devices 112 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120.

As can be seen in FIG. 1, wireless signals 122 (represented by a jagged line) are transmitted from radio 120-1 in access point 110-1. These wireless signals may be received by radio 120-4 in electronic device 112-1. Notably, access point 110-1 may transmit packets. In turn, these packets may be received by electronic device 112-1. Moreover, access point 110-1 may allow electronic device 112-1 to communicate with other electronic devices, computers and/or servers via networks 116 and/or 118.

Note that the communication among access points 110 and/or with electronic devices 112 may be characterized by a variety of performance metrics (which are sometimes referred to as 'communication performance metrics'), such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, an SNR, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving signals (such as wireless signals 122) with the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, it can be difficult to perform an accurate radio survey of WLAN 114, especially when WLAN 114 is implemented in an indoor environment (such as one that does not include a local positioning system that determines locations or positions in the environment). As described further below with reference to FIGS. 2-5, in order to address this problem the communication technique may allow a user (such as a network administrator) to specify one or more locations in an environment (e.g., relative to one or more visual landmarks in the environment) via an augmented reality application that executes on or in one of electronic devices (such as electronic device 112-1). For example, the user may define or 'drop' a pin in the augmented reality application at a location of interest (which is sometimes referred to as an 'anchor point'). More generally, the user may specify the location based at least in part on user-interface activity when using the user interface. Thus, using the augmented reality application, the user may walk around the environment and can intuitively specify one or more locations that are of interest, i.e., that the user would like to have characterized.

In response to receiving information that specifies the location from the augmented reality application, electronic device 112-1 may provide the information to one of access points 110 (such as access point 110-1) and/or controller 108, where the location is within communication range of access point 110-1.

After collecting or performing measurements of one or more communication performance metrics (such as RSSI, throughput, latency and/or SNR) at or proximate to the location during a time interval (such as a day, a week or a month), access point 110-1 may optionally provide the measurements to controller 108. Then, access point 110-1 and/or controller 108 may provide the measurements (or a summary of the measurements) to electronic device 112-1. Next, electronic device 112-1 may provide a graphical representation of the communication performance (such as 'good,' 'intermediate' or 'bad') at or proximate to the location based at least in part on the measurements. For example, electronic device 112-1 may display the graphical representation of the communication performance, such as in the user interface associated with the augmented reality application. In some embodiments, the graphical representation includes a 'heat map,' such as a contour map of communication performance that indicates low-signal areas or dead zones in an environment and/or over deployment in the environment.

In order to make the content provided in the augmented reality intuitive, electronic device 112-1 may provide or present additional information along with the graphical representation. For example, electronic device 112-1 may provide a layout (or floor map) of the environment (such as a floor a building or an outdoor region) along with the graphical representation. Alternatively or additionally, electronic device 112-1 may provide statistics summarizing the measurements with the graphical representation, and presentation of the statistics along with the graphical representation may be selectable via a user-interface icon associated with the location. For example, in response to activation of a user-interface icon (such as a physical key, a virtual icon on a touch-sensitive display, using a voice command, etc.), electronic device 112-1 may modify the displayed content in the augmented reality application to display the statistics proximate to the location in the augmented reality.

In some embodiments, electronic device 112-1, access point 110-1 and/or controller 108 may provide a visual indication (such as a graphical character) to one or more other electronic devices (such as electronic device 112-2). The visual indication may be intended for inclusion in instances of the user interface associated with the augmented reality application that executes on or in the one or more other electronic devices. Moreover, the visual indication may encourage communication with the one or more other electronic devices at or proximate to the location. For example, when ever users interact with the visual indication in the instances of the user interface (such as by grabbing or activating a user-interface device associated with the visual indicator), the one or more other electronic devices may communicate with access point 110-1. These users may interact with the visual indication as part of a video game and/or in exchange for financial compensation (such as receiving points within the video game, receiving a credit or payment into the users' financial accounts, etc.). In this way, the communication technique may provide an incentive to the users to help ensure that there are sufficient measurements to accurately assess the communication performance at the location.

While the previous discussion illustrated the communication technique with an augmented reality application that is installed on and that executes in an environment (such as an operating system) of electronic device 110-1, in other embodiments the augmented reality application executes in an environment of a Web browser. For example, the augmented reality application may be a Web browser plugin. In some embodiments, the augmented reality application is implemented using a client-server architecture. For example, server 124 may provide user-interface information that specifies a dynamic user interface for display on electronic device 112-1.

Moreover, while the preceding example illustrated the use of the communication technique to perform a post-deployment radio survey, in other embodiments a modified version of the communication technique may be used prior to deployment to allow the expected coverage in WLAN 114 to be assessed and, thus, for WLAN 114 to be designed. For example, using the augmented reality application on electronic device 112-1, a user may specify a configuration of access points 110 in an environment, such as the number of access points, the locations of access points 110, the types of access points, the transmit powers of access points 110, etc. Then, using a predetermined look-up table of signal strength as a function of distance for the specified access points 110 with or without interference from neighboring access points, the augmented reality application may display a graphical representation of the communication performance in the environment, the layout and/or summary statistics, such as a contour map of RSSI in the environment. This information may allow the user to roughly select the spacings or locations of access points 110 to avoid low-signal regions or dead zones and/or over deployment in the environment.

In some embodiments, electronic device 112-1 may perform measurements (such as throughput, RSSI, SNR, packet error rate, latency, etc.) of the neighboring access points that are proximate to a desired or intended location of an access point in WLAN 114, to allow the user to assess the real-world impact in the environment. This may allow the user to iteratively or dynamically build WLAN 114. For example, the user can empirically layout access points 110 and then can use the augmented reality application on electronic device 112-1 to intuitively and visually assess the communication performance of the current layout to determine if there are any low-signal regions or dead zones and/or over deployment in the environment.

Note that the communication technique may also provide a visual representation of the aesthetics of a proposed deployment or configuration, such as how access points 110 will look in the environment.

While the preceding embodiments illustrated the communication technique using electronic device 112-1, in other embodiments the communication technique may be implemented on a different electronic device. For example, the user may interact with the dynamic user interface via a computer (such as a desktop computer, controller 108 or server 124), instead of a portable electronic device, such as electronic device 112-1.

In these ways, the communication technique may allow a user to accurately and intuitively characterize communication performance in the environment, either before or after deployment of WLAN 114. This capability may assist the user in diagnosing or trouble shooting any performance issues in WLAN 114, and may allow the user to take appropriate remedial action, e.g., to reduce or eliminate any low-signal regions or dead zones (e.g., a region in which the one or more communication performance metrics are, on average during the time interval, more than 50% less than surrounding regions). Moreover, the communication technique may allow the user to ensure the communication performance in WLAN 114 without requiring the use of a local positioning system in the environment. Consequently, the communication technique may facilitate improved communication performance in WLAN 114, and thus may improve the user experience when using WLAN 114.

Figure 2:
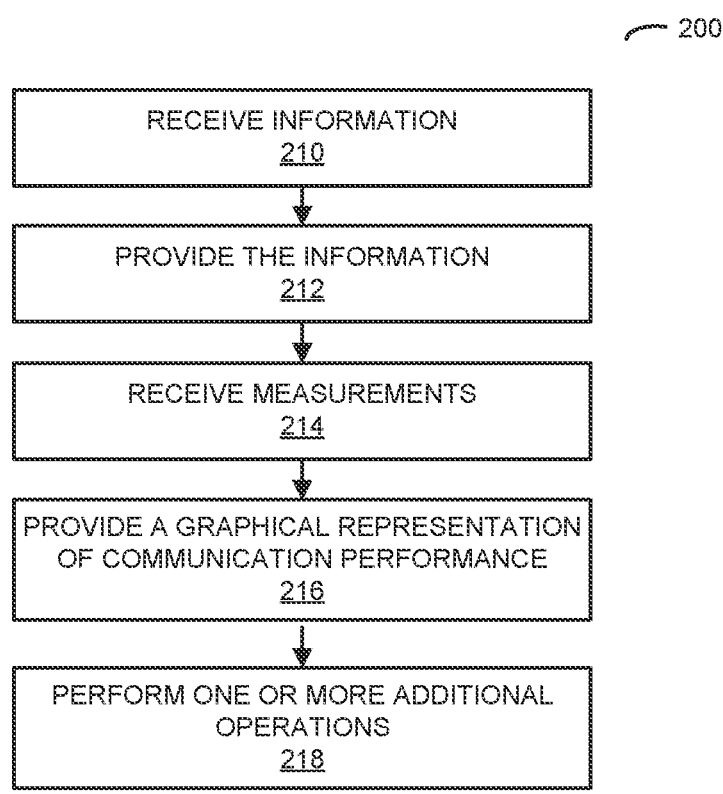
FIG. 2 is a flow diagram illustrating a method for characterizing communication performance using an electronic device in FIG. 1 in accordance with an embodiment of the present disclosure.

We now describe embodiments of the method. FIG. 2 presents a flow diagram illustrating an example of a method 200 for characterizing communication performance using an electronic device, such as electronic device 112-1 in FIG. 1. For example, the electronic device may include a portable electronic device (such as a cellular telephone).

During operation, the electronic device may receive information (operation 210) specifying a location in an environment. For example, the information may specify the location relative to one or more visual landmarks in the environment.

Then, the electronic device may provide the information (operation 212) to the access point and/or a controller of the access point, where the location is within communication range of the access point.

Next, the electronic device may receive, from the access point and/or the controller, measurements (operation 214) of one or more communication performance metrics at or proximate to the location during a time interval. For example, the one or more communication performance metrics may include at least one of: an RSSI, an SNR, or latency. Note that the time interval may include: a day, a week or a month.

Moreover, the electronic device may provide a graphical representation of the communication performance (operation 216) at or proximate to the location based at least in part on the measurements. For example, the graphical representation may include a contour map.

In some embodiments, the electronic device optionally performs one or more additional operations (operation 218). Notably, the electronic device may provide a user interface corresponding to the environment, and the information may correspond to user-interface activity associated with the user interface. For example, the user interface may include or may provide an augmented reality associated with the environment and the user-interface activity may include defining the location, such as by dropping a pin in the augmented reality. Furthermore, providing the user interface may include displaying the user interface on a display (such as a display in or associated with the electronic device) and/or providing the graphical representation may include displaying the graphical representation on the display.

Additionally, the electronic device may provide a visual indication to one or more other electronic devices. The visual indication may be intended for inclusion in instances of the user interface on the one or more other electronic devices and the visual indication may encourage communication with the one or more other electronic devices at or proximate to the location. Alternatively, the access point or the controller may provide the visual indication after receiving the information specifying the location from the electronic device.

Note that the electronic device may provide a layout of the environment along with the graphical representation. Alternatively or additionally, the electronic device may provide statistics summarizing the measurements with the graphical representation, and presentation of the statistics along with the graphical representation may be selectable via a user-interface icon associated with the location.

In some embodiments, the electronic device may provide current measurements of the RSSI and/or the SNR (and, more generally, one or more communication performance metrics) at one or more locations in the environment prior to receiving the information (operation 210). For example, the RSSI and/or the SNR at the one or more locations in the user interface. The current measurements may assist a user in determining where to specify or define a location of interest (and, thus, to provide the information to the electronic device). Consequently, in method 200 there may be a dynamic interaction between the electronic device, which performs and display the one or more current measurements, and the user that specifies or defines the location via the user interface based at least in part on the displayed one or more current measurements.

In some embodiments of method 200, there may be additional or fewer operations. Furthermore, the order of the operations may be changed, and/or two or more operations may be combined into a single operation. For example, in method 200, there may be multiple locations specified. Moreover, using method 200, the electronic device may characterize the communication performance of different WLANs at one or more user-specified locations, such as three different WLANs having different service set identifiers (SSIDs).

Figure 3:
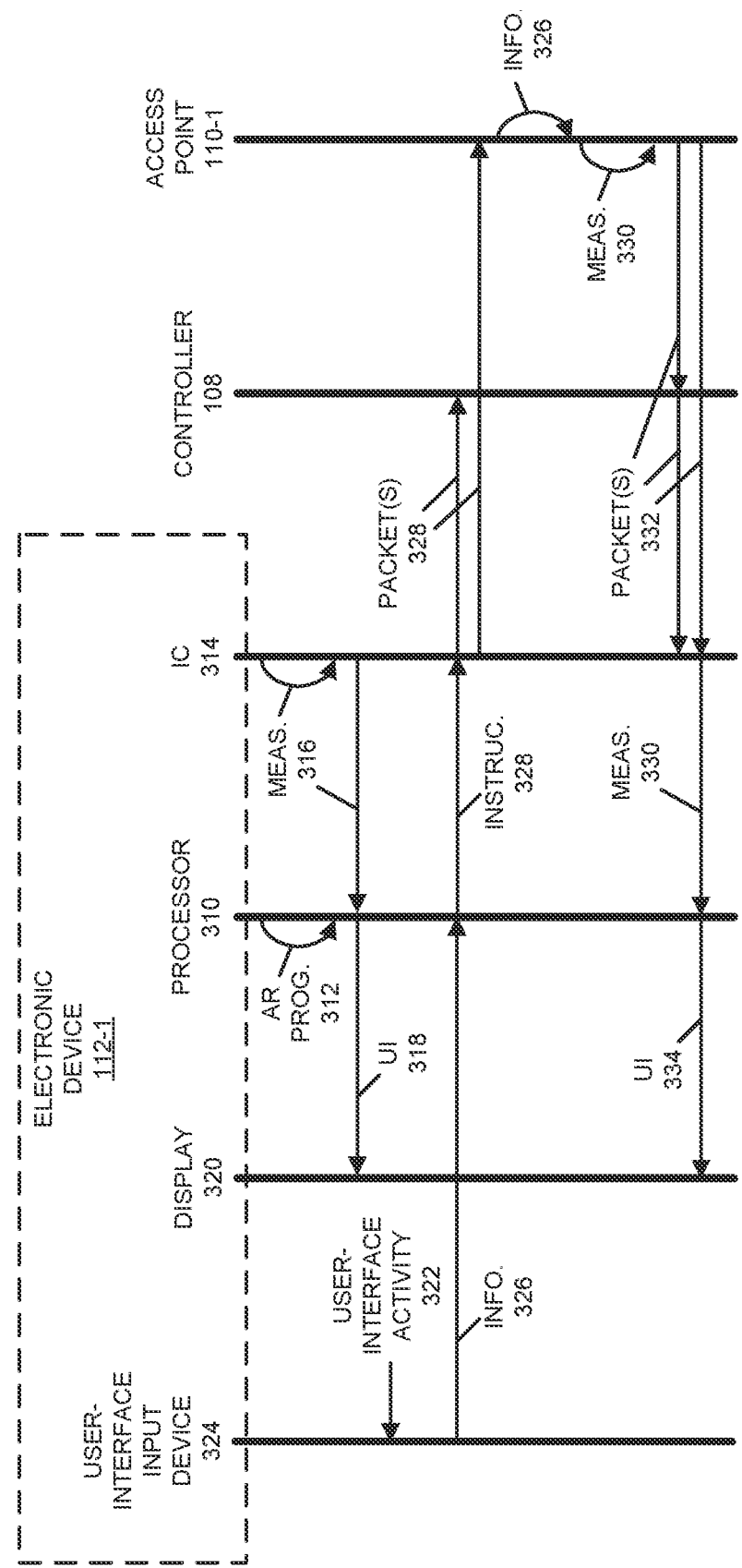
FIG. 3 is a drawing illustrating communication among the electronic devices in FIG. 1 in accordance with an embodiment of the present disclosure.

FIG. 3 presents a drawing illustrating an example of communication among controller 108, access point 110-1 and electronic device 112-1. During operation, processor 310 in electronic device 112-1 may execute an augmented reality (AR) program 312. Moreover, interface circuit (IC) 314 in electronic device may perform measurements 316 of one or more communication performance metrics, and may provide measurements 316 to processor 310. In response, processor 310 may display a graphical representation of measurements 316 in a user interface (UI) 318 on display 320 in electronic device 112-1.

Based on the graphical representation, a user of electronic device 112-1 may interact with user interface 318 to specify or define a location 322, such as by dropping a pin in user interface 318 corresponding to a location. Notably, user-interface activity 322, which is received by user-interface input device 324 (such as a keyboard, a touchpad, a stylus, a mouse, a touch screen, a voice interface, etc.) in electronic device 112-1, may specify the location. Then, user-interface input device 322 may provide information 326 that specifies the location to processor 310.

Next, processor 310 may instruct 328 interface circuit 314 to provide information 326 to access point 110-1 and/or controller 108. In response, interface circuit 314 may transmit one or more packets (or frames) 328 with information 326 to access point 110-1 and/or controller 108. Moreover, in response to receiving information 326, access point 110-1 may perform additional measurements 330 of the one or more communication performance metrics during a time interval. These measurements may be provided by access point 110-1 to electronic device 112-1, either directly or via controller 108 by transmitting one or more packets (or frames) 332.

After receiving measurements 330 in the one or more packets 332, interface circuit 314 may provide measurements 330 to processor 310. Next, processor 310 may display a graphical representation of measurements 330 in user interface 334 on display 320.

While FIG. 3 illustrate communication between components using unidirectional or bidirectional communication with lines having single arrows or double arrows, in general the communication in a given operation in this figure may involve unidirectional or bidirectional communication.

Figure 4:
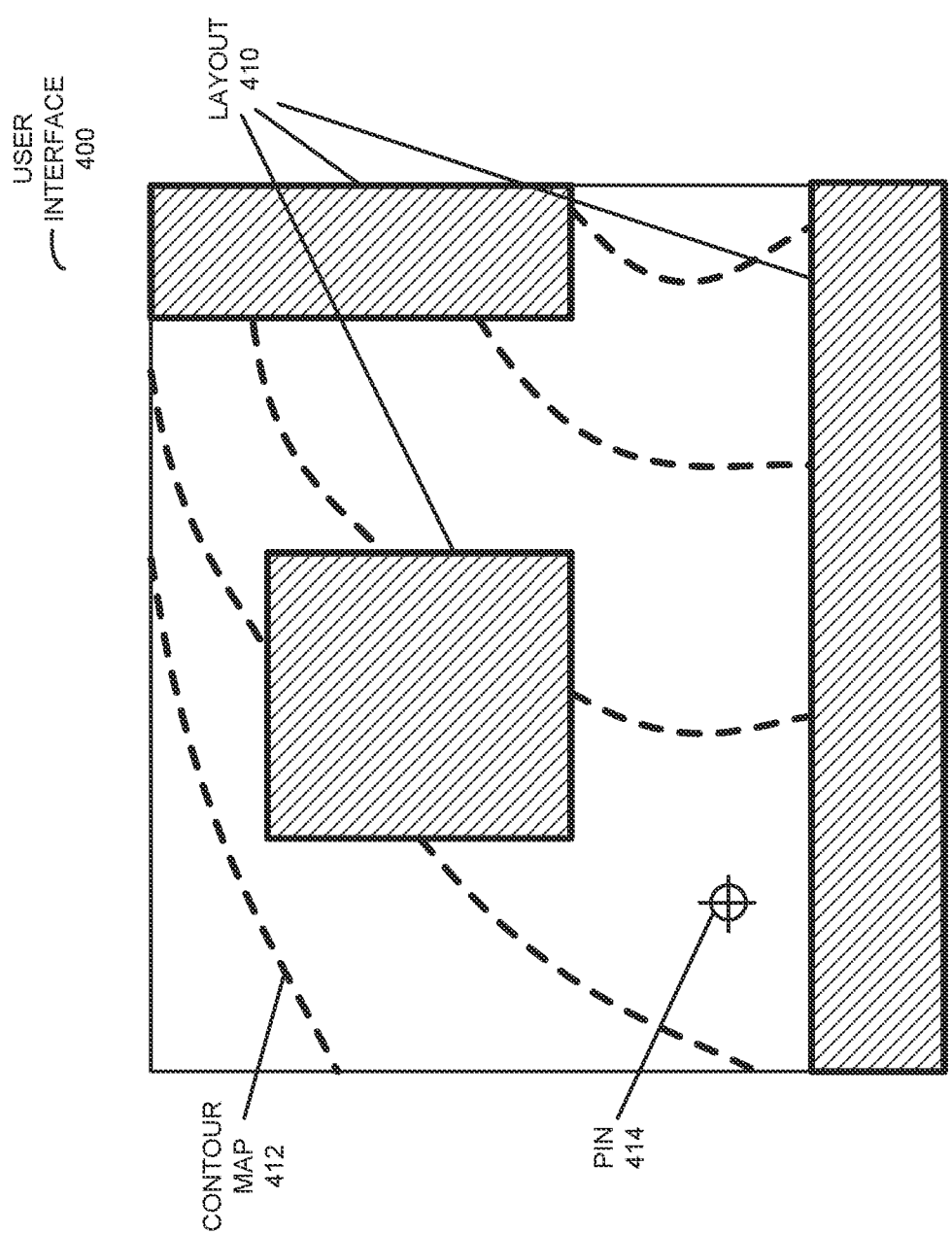
FIG. 4 is a drawing illustrating a user interface for use with an electronic device in FIG. 1 in accordance with an embodiment of the present disclosure.

We now describe embodiments of a user interface in an augmented reality application. FIG. 4 presents a drawing illustrating an example of a user interface 400 for use with an electronic device, such as electronic device 112-1. User interface 400 may display a layout 410 of an environment and/or an image of the environment (such as an image acquired with a camera or an image sensor in the electronic device). In some embodiments, user interface 400 may display a graphical representation of current measurements of one or more communication performance metrics at one or more locations in the environment. For example, user interface 400 may include a contour map 412 based at least in part on the current measurements. Furthermore, using user interface 400, a user may specify or define a location of interest that is to be characterized using the communication technique. For example, a user may drop a pin 414 at the location.

Figure 5:
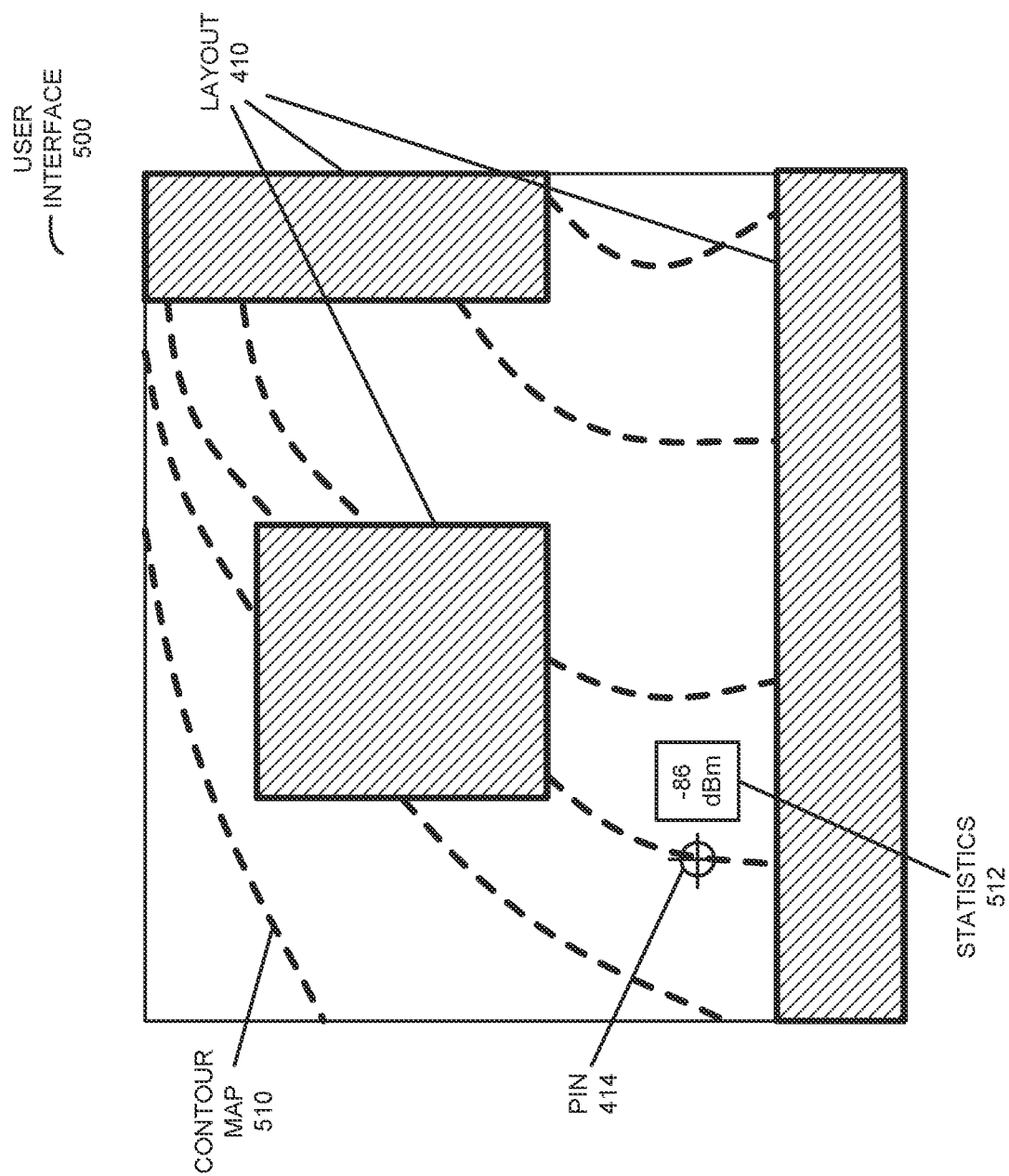
FIG. 5 is a drawing illustrating a user interface for use with an electronic device in FIG. 1 in accordance with an embodiment of the present disclosure.

FIG. 5 presents a drawing illustrating an example of a user interface 500 for use with an electronic device, such as electronic device 112-1. User interface 500 may display a layout 410 of the environment and/or an image of the environment (such as an image acquired with a camera or an image sensor in the electronic device). Moreover, user interface 500 may display a graphical representation of measurements of one or more communication performance metrics performed during a time interval at at least one or more user-specified locations in the environment. For example, user interface 500 may include a contour map 510 based at least in part on the measurements. Furthermore, by interacting with user interface 500 (such as by activating a virtual icon on a touch-sensitive display), a user may select to have statistics 512 for the measurements displayed in proximity to pin 414 in user interface 500.

We now describe embodiments of an electronic device, which may perform at least some of the operations in the communication technique. FIG. 6 presents a block diagram illustrating an example of an electronic device 600 in accordance with some embodiments, such as one of access points 110 or electronic devices 112. This electronic device includes processing subsystem 610, memory subsystem 612, and networking subsystem 614. Processing subsystem 610 includes one or more devices configured to perform computational operations. For example, processing subsystem 610 can include one or more microprocessors, ASICs, microcontrollers, programmable-logic devices, one or more graphics process units (GPUs) and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory, in some embodiments, instructions for processing subsystem 610 in memory subsystem 612 include: one or more program modules or sets of instructions (such as program instructions 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more nodes, such as nodes 608, e.g., a network node that can be connected or coupled to a network, or a pad that can be coupled to the one or more antennas 620. Thus, electronic device 600 may or may not include the one or more antennas 620.) For example, networking subsystem 614 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Note that a transmit or receive antenna pattern (or antenna radiation pattern) of electronic device 600 may be adapted or changed using pattern shapers (such as reflectors) in one or more antennas 620 (or antenna elements), which can be independently and selectively electrically coupled to ground to steer the transmit antenna pattern in different directions. Thus, if one or more antennas 620 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 600 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program instructions 622 are included in operating system 624 and/or control logic 616 is included in interface circuit 615. In some embodiments, the communication technique is implemented using information in layer 2 and/or layer 3 of the Open System Interconnection model.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 614 (or, more generally, of electronic device 600). The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and a Wi-Fi communication protocol as an illustrative example, in other embodiments a wide variety of communication protocols and, more generally, wired and/or wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 622, operating system 624 (such as a driver for interface circuit 618) or in firmware in interface circuit 618. Alternatively or additionally, at least some of the operations in the communication technique may be implemented in a physical layer, such as hardware in interface circuit 618.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer, comprising:
an interface circuit configured to communicate with an electronic device and an access point or a controller of the access point, wherein the computer is configured to:
receive, associated with the electronic device, information specifying a user-selected predefined or pre-specified location in an environment;
provide, addressed to the access point, the controller or both, the information, wherein the predefined or pre-specified location is within communication range of the access point and the predefined or pre-specified location is different from a second location of the access point;
receive, associated with the access point, the controller or both, measurements of one or more communication performance metrics at or proximate to the predefined or pre-specified location during a time interval; and
provide, addressed to the electronic device, a graphical representation of communication performance at or proximate to the predefined or pre-specified location based at least in part on the measurements.

2. The computer of claim 1, wherein the computer is configured to provide, addressed to the electronic device, a user interface corresponding to the environment; and
wherein the user interface comprises the graphical representation.

3. The computer of claim 2, wherein the user interface comprises an augmented reality associated with the environment.

4. The computer of claim 2, wherein the user-selected predefined or pre-specified location was defined or selected in the augmented reality.

5. The computer of claim 2, wherein the computer is configured to provide, addressed to one or more other electronic devices, a visual indication; and
wherein in the visual indication is intended for inclusion in instances of the user interface and the visual indication encourages communication between the electronic device and the one or more other electronic devices at or proximate to the predefined or pre-specified location.

6. The computer of claim 2, wherein the computer is configured to provide statistics summarizing the measurements with the graphical representation; and
wherein presentation of the statistics along with the graphical representation is selectable via a user-interface icon in the user interface and the user-interface icon is associated with the predefined or pre-specified location.

7. The computer of claim 1, wherein the graphical representation comprises a contour map.

8. The computer of claim 1, wherein the computer is configured to provide a layout of the environment along with the graphical representation.

9. The computer of claim 1, wherein the electronic device comprises a portable electronic device.

10. The computer of claim 1, wherein the one or more communication performance metrics comprise at least one of: a received signal strength indication (RSSI), a signal-to-noise ratio (SNR), or latency.

11. The computer of claim 1, wherein the information specifies the predefined or pre-specified location relative to one or more visual landmarks in the environment.

12. A non-transitory computer-readable storage medium for use in conjunction with a computer, the computer-readable storage medium storing program instructions that, when executed by the computer, causes the computer to perform operations comprising:
   receiving, associated with an electronic device, information specifying a user-selected predefined or pre-specified location in an environment;
   providing, addressed to an access point, a controller of the access point or both, the information, wherein the predefined or pre-specified location is within communication range of the access point and the predefined or pre-specified location is different from a second location of the access point;
   receiving, associated with the access point, the controller or both, measurements of one or more communication performance metrics at or proximate to the predefined or pre-specified location during a time interval; and
   providing, addressed to the electronic device, a graphical representation of communication performance at or proximate to the predefined or pre-specified location based at least in part on the measurements.

13. The non-transitory computer-readable storage medium of claim 12, wherein the operations comprise providing, addressed to the electronic device, a user interface corresponding to the environment; and
   wherein the user interface comprises the graphical representation.

14. The non-transitory computer-readable storage medium of claim 13, wherein the user interface comprises an augmented reality associated with the environment.

15. The non-transitory computer-readable storage medium of claim 12, wherein the graphical representation comprises a contour map; and
   wherein the operations comprise providing a layout of the environment along with the graphical representation.

16. A method for assessing communication performance, comprising:
   by a computer:
   receiving, associated with an electronic device, information specifying a user-selected predefined or pre-specified location in an environment;
   providing, addressed to an access point, a controller of the access point or both, the information, wherein the predefined or pre-specified location is within communication range of the access point and the predefined or pre-specified location is different from a second location of the access point;
   receiving, associated with the access point, the controller or both, measurements of one or more communication performance metrics at or proximate to the predefined or pre-specified location during a time interval; and
   providing, addressed to the electronic device, a graphical representation of communication performance at or proximate to the predefined or pre-specified location based at least in part on the measurements.

17. The method of claim 16, wherein the method comprises providing, addressed to the electronic device, a user interface corresponding to the environment; and
   wherein the user interface comprises the graphical representation.

18. The method of claim 17, wherein the user interface comprises an augmented reality associated with the environment.

19. The method of claim 16, wherein the graphical representation comprises a contour map.

20. The method of claim 16, wherein the method comprises providing a layout of the environment along with the graphical representation.

* * * * *